(12) United States Patent
Narita

(10) Patent No.: US 11,385,745 B2
(45) Date of Patent: Jul. 12, 2022

(54) CONDUCTIVE MEMBER, TOUCH PANEL SENSOR, TOUCH PANEL, AND METHOD FOR MANUFACTURING MOLDED ARTICLE

(71) Applicant: FUJIFILM Corporation, Tokyo (JP)

(72) Inventor: Takeshi Narita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/205,693

(22) Filed: Mar. 18, 2021

(65) Prior Publication Data

US 2021/0208707 A1 Jul. 8, 2021

Related U.S. Application Data

(63) Continuation of application No. PCT/JP2019/037746, filed on Sep. 26, 2019.

(30) Foreign Application Priority Data

Sep. 28, 2018 (JP) .............................. JP2018-185566

(51) Int. Cl.
*G06F 3/044* (2006.01)
*B32B 15/02* (2006.01)
(Continued)

(52) U.S. Cl.
CPC .............. *G06F 3/044* (2013.01); *B29C 45/14* (2013.01); *B32B 7/025* (2019.01); *B32B 15/02* (2013.01);
(Continued)

(58) Field of Classification Search
CPC ......... G06F 3/0446; G06F 2203/04103; G06F 2203/04111
See application file for complete search history.

(56) References Cited

U.S. PATENT DOCUMENTS

2006/0103632 A1 5/2006 Bourdelais et al.
2010/0080893 A1* 4/2010 Inoue ...................... C23C 18/30
427/123
(Continued)

FOREIGN PATENT DOCUMENTS

JP 2009-006698 A 1/2009
JP 2010-258791 A 11/2010
(Continued)

OTHER PUBLICATIONS

International Search Report issued in PCT/JP2019/037746; dated Dec. 17, 2019.
(Continued)

*Primary Examiner* — Md Saiful A Siddiqui
(74) *Attorney, Agent, or Firm* — Studebaker & Brackett PC

(57) ABSTRACT

A conductive member is provided including a substrate, an interlayer disposed on at least one surface of the substrate, a patterned plating target layer disposed in the form of a mesh on the interlayer having a functional group interacting with a plating catalyst or a precursor thereof, a mesh-shaped metal layer that is disposed on the patterned plating target layer and includes a plurality of crossing thin metal wires, and a protective layer disposed on the metal layer. In a case where "a" represents a modulus of elasticity of the substrate at 25° C. and "b" represents a modulus of elasticity of the interlayer at 25° C., the conductive member satisfies the following Formula A, Formula A: 0.010≤b/a≤0.500, an area ratio of the metal layer is 0.2% to 60%, and a modulus of elasticity of the protective layer at 25° C. is 0.10 to 5.00 GPa.

20 Claims, 2 Drawing Sheets

(51) Int. Cl.
 B32B 7/025 (2019.01)
 B29C 45/14 (2006.01)
(52) U.S. Cl.
 CPC ............ *G06F 2203/04103* (2013.01); *G06F 2203/04112* (2013.01)

(56) References Cited

U.S. PATENT DOCUMENTS

| | | | |
|---|---|---|---|
| 2011/0047384 A1 | 2/2011 | Jacobs et al. | |
| 2014/0078422 A1 | 3/2014 | Tanabe et al. | |
| 2017/0067165 A1* | 3/2017 | Tsukamoto | G06F 3/041 |
| 2019/0179453 A1 | 6/2019 | Hattori et al. | |

FOREIGN PATENT DOCUMENTS

| | | |
|---|---|---|
| JP | 2011-222797 A | 11/2011 |
| JP | 2012-238467 A | 12/2012 |
| JP | 2014-193851 A | 10/2014 |
| JP | 2018-147855 A | 9/2018 |
| WO | 2013-502654 A | 1/2013 |
| WO | 2018/12203 A1 | 1/2018 |
| WO | 2018/012535 A1 | 1/2018 |
| WO | 2018/034291 A1 | 2/2018 |
| WO | 2018/047493 A1 | 3/2018 |

OTHER PUBLICATIONS

International Preliminary Report on Patentability and Written Opinion issued in PCT/JP2019/037746; dated Mar. 23, 2021.

* cited by examiner

CONDUCTIVE MEMBER, TOUCH PANEL SENSOR, TOUCH PANEL, AND METHOD FOR MANUFACTURING MOLDED ARTICLE

CROSS-REFERENCE TO RELATED APPLICATIONS

This application is a Continuation of PCT International Application No. PCT/JP2019/037746 filed on Sep. 26, 2019, which claims priority under 35 U.S.C. § 119(a) to Japanese Patent Application No. 2018-185566 filed on Sep. 28, 2018. The above application is hereby expressly incorporated by reference, in its entirety, into the present application.

BACKGROUND OF THE INVENTION

1. Field of the Invention

The present invention relates to a conductive member, a touch panel sensor, a touch panel, and a method for manufacturing a molded article.

2. Description of the Related Art

A conductive film in which a metal layer (preferably a patterned metal layer) is disposed on a substrate has various uses. For example, in recent years, as touch panels have been more frequently mounted on mobile phones, handheld game consoles, and the like, the demand for conductive films for multi-point sensible capacitive touch panel sensors has rapidly increased.

Various conductive film manufacturing methods have been proposed, and for example, a method using a plating treatment has been proposed.

For instance, Examples in WO2018/012535A disclose a method for manufacturing a conductive film, including forming a patterned plating target layer by using a plating target layer-forming composition and forming a metal layer on the plating target layer by a plating treatment, in which the composition contains a resin having a polymerizable group and a functional group interacting with a plating catalyst or a precursor thereof and a polyfunctional acrylamide compound. Furthermore, WO2018/012535A also discloses a method for manufacturing a three-dimensional circuit board by additionally providing a resin layer on the conductive film by insert injection molding so as to improve the self-supporting property of the obtained conductive film.

SUMMARY OF THE INVENTION

With reference to WO2018/012535A, the inventors of the present invention prepared and examined a conductive film (conductive member) and a molded article in which a resin layer is laminated on the conductive member. As a result, it has been revealed that particularly in a case where a metal layer disposed on a patterned plating target layer is in the form of a mesh consisting of a plurality of crossing thin metal wires, sometimes the thin metal wires are broken, for example, in a process such as insert injection molding during which the conductive member is exposed to a high temperature environment and/or a high pressure environment.

Meanwhile, the conductive member is also required to hardly allow thin metal wires in the conductive member to be broken even though impact is applied thereto (in other words, the conductive member is required to have excellent impact resistance).

An object of the present invention is to provide a conductive member which inhibits the breakage of thin metal wires in a case where the conductive member is subjected to a process during which the conductive member is exposed to a high temperature environment and/or a high pressure environment, and has excellent impact resistance.

Another object of the present invention is to provide a touch panel sensor and a touch panel that use the conductive member.

A still another object of the present invention is to provide a method for manufacturing a molded article using the conductive member.

In order to achieve the above objects, the inventors of the present invention conducted intensive studies. As a result, the inventors have found that the objects can be achieved by a conductive member having a predetermined constitution, and have accomplished the present invention.

[1] A conductive member including a substrate, an interlayer disposed on at least one surface of the substrate, a patterned plating target layer that is disposed in the form of a mesh on the interlayer and has a functional group interacting with a plating catalyst or a precursor thereof, a mesh-shaped metal layer that is disposed on the patterned plating target layer and includes a plurality of crossing thin metal wires, and a protective layer disposed on the metal layer, in which in a case where a represents a modulus of elasticity of the substrate at 25° C. and b represents a modulus of elasticity of the interlayer at 25° C., the conductive member satisfies the following Formula A, $$0.010 \leq b/a \leq 0.500 \quad \text{Formula A:}$$

an area ratio of the metal layer is 0.2% to 60%, and a modulus of elasticity of the protective layer at 25° C. is 0.10 to 5.00 GPa.

[2] The conductive member described in [1], in which the metal layer contains one or more metals selected from the group consisting of copper, nickel, and gold.

[3] The conductive member described in [1] or [2], in which a thickness of the interlayer is 0.2 to 5.0 µm.

[4] The conductive member described in any one of [1] to [3], in which the patterned plating target layer is a layer formed by forming a precursor layer of a plating target layer on the interlayer and performing an exposure treatment in the form of a mesh on the precursor layer of a plating target layer, and the precursor layer contains the following compound X or composition Y, compound X: a compound having a functional group interacting with a plating catalyst or a precursor thereof and a polymerizable group, composition Y: a composition containing a compound having a functional group that interacts with a plating catalyst or a precursor thereof and a compound having a polymerizable group.

[5] The conductive member described in any one of [1] to [4], in which the metal layer is a layer formed by applying a plating catalyst or a precursor thereof to the patterned plating target layer and performing a plating treatment on the patterned plating target layer to which the plating catalyst or a precursor thereof is applied.

[6] The conductive member described in any one of [1] to [5], in which the modulus of elasticity of the protective layer at 25° C. is 1.00 to 3.00 GPa.

[7] The conductive member described in any one of [1] to [6], which satisfies the following formula B, $$0.010 \leq b/a \leq 0.200. \quad \text{Formula B:}$$

[8] A touch panel sensor including the conductive member described in any one of [1] to [7].

[9] A touch panel including the conductive member described in any one of [1] to [7]. [10] A method for manufacturing a molded article using the conductive member described in any one of [1] to [7], including steps of disposing the conductive member on one of a first mold and a second mold so that the substrate and one of the molds face each other, clamping the first mold and the second mold together, and injecting a resin into a mold cavity formed by the first mold and the second mold so as to obtain a molded article including the conductive member and a resin layer.

According to an aspect of the present invention, it is possible to provide a conductive member which inhibits the breakage of thin metal wires in a case where the conductive member is subjected to a process during which the conductive member is exposed to a high temperature environment and/or a high pressure environment, and has excellent impact resistance.

Furthermore, according to another aspect of the present invention, it is possible to provide a touch panel sensor and a touch panel that use the conductive member.

In addition, according to still another aspect of the present invention, it is possible to provide a method for manufacturing a molded article using the conductive member.

DESCRIPTION OF THE PREFERRED EMBODIMENTS

Hereinafter, the present invention will be specifically described.

The following constituents will be described based on typical embodiments of the present invention in some cases. However, the present invention is not limited to the embodiments.

In the present specification, a range of numerical values described using "to" means a range including the numerical values listed before and after "to" as the lower limit and the upper limit.

Furthermore, "actinic ray" or "radiation" in the present specification means, for example, a bright line spectrum of a mercury lamp, far ultraviolet rays represented by an excimer laser, extreme ultraviolet rays (light for EUV: Extreme ultraviolet lithography), X-rays, electron beams, and the like. Furthermore, in the present specification, light means actinic rays and radiation. Unless otherwise specified, "exposure" in the present specification means not only the exposure performed using a mercury lamp, far ultraviolet rays represented by an excimer laser, X-rays, EUV light, and the like, but also the lithography performed using particle beams such as electron beams and ion beams.

Furthermore, in the present specification, "(meth)acryl" means either acryl or methacryl.

[Conductive Member]

The inventors of the present invention investigated the cause of breakage of the mesh-shaped metal layer in the conductive member in a process during which the conductive member is exposed to a high temperature environment and/or a high pressure environment (hereinafter, also called "high-temperature and high-pressure process"). As a result, the inventors have found that in a case where the conductive member has a constitution in which a mesh-shaped metal layer having an area ratio set to be equal to or lower than a predetermined value is disposed between an interlayer and a protective layer each having a modulus of elasticity adjusted to a predetermined value, the breakage of the thin metal wires in the high-temperature and high-pressure process is inhibited.

Furthermore, the inventors have revealed that the conductive member having the above constitution also has excellent impact resistance. That is, the inventors have revealed that in such a conductive member, the thin metal wires constituting the mesh-shaped metal layer are hardly broken even though impact is applied to the conductive member.

Hereinafter, preferred embodiments of the conductive member according to an embodiment of the present invention will be described with reference to drawings.

First Embodiment

Figure 1:
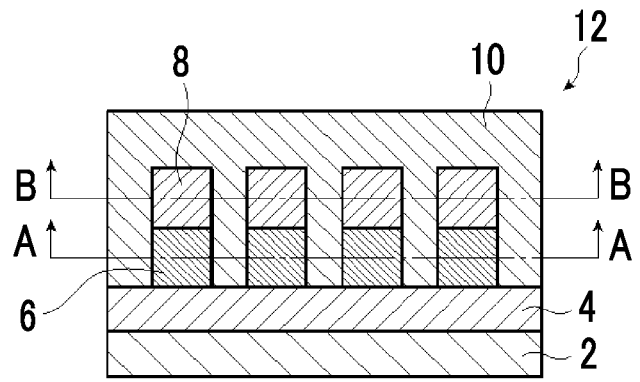
FIG. 1 is a cross-sectional view of a conductive member 12.

FIG. 1 is a schematic cross-sectional view of a conductive member according to a first embodiment of the present invention.

A conductive member 12 of the first embodiment has a substrate 2, an interlayer 4 disposed on at least one surface of the substrate 2, a patterned plating target layer 6 disposed in the form of a mesh on the interlayer, a mesh-shaped metal layer 8 that is disposed on the patterned plating target layer 6 and constituted with a plurality of crossing thin metal wires, and a protective layer 10 disposed to cover the interlayer 4, the patterned plating target layer 6, and the mesh-shaped metal layer 8.

In a case where a represents a modulus of elasticity of the substrate 2 at 25° C., and b represents a modulus of elasticity of the interlayer 4 at 25° C., the conductive member 12 satisfies the following Formula A.

$$0.010 \leq b/a \leq 0.500 \qquad \text{Formula A:}$$

The modulus of elasticity of the substrate 2 at 25° C. means a value determined by cutting the conductive member 12 by using an ultramicrotome, taking the region of the substrate 2 in the cut cross section as a measurement surface, and measuring a modulus of elasticity by using an atomic force microscope (AFM) in an environment of 25° C. Furthermore, the modulus of elasticity of the interlayer 4 at 25° C. means a value determined by cutting the conductive member 12 by using an ultramicrotome, taking the region of the interlayer 4 in the cut cross section as a measurement surface, and measuring a modulus of elasticity by using AFM in an environment of 25° C.

As AFM, for example, an MFP-3D INFINITY type AFM manufactured by Oxford Instruments Asylum Research Inc. can be used. Both the modulus of elasticity a and modulus of elasticity b are expressed using a unit GPa.

In view of further inhibiting the breakage of the thin metal wires in a high-temperature and high-pressure process and/ or in view of further improving the impact resistance, the value represented by b/a is preferably equal to or lower than 0.400, more preferably equal to or lower than 0.300, and even more preferably equal to or lower than 0.200.

That is, it is preferable that the conductive member satisfy Formula B.

$$0.010 \leq b/a \leq 0.200.$$ Formula B:

Furthermore, as will be described later, in the conductive member 12, the area ratio of the metal layer 8 is 0.2% to 60%, and the modulus of elasticity of the protective layer 10 at 25° C. is 0.10 to 5.00 GPa.

Hereinafter, the constitution of the conductive member 12 will be specifically described.

<Substrate 2>

The type of the substrate 2 is not particularly limited as long as the substrate 2 has a main surface and supports the interlayer 4. As the substrate 2, a flexible substrate (preferably an insulating substrate) is preferable, and a resin substrate is more preferable.

The transmittance of the substrate 2 for visible light (wavelength: 400 to 800 nm) is preferably equal to or higher than 60%, more preferably equal to or higher than 80%, even more preferably equal to or higher than 90%, and particularly preferably equal to or higher than 95%. The upper limit of the transmittance is equal to or lower than 100%.

Examples of the material constituting the resin substrate include a polycarbonate-based resin, a polyether sulfone-based resin, a poly(meth)acrylic resin, a polyurethane-based resin, a polyester-based resin (such as polyethylene terephthalate or polyethylene naphthalate), a polysulfone-based resin, a polyamide-based resin, a polyarylate-based resin, a polyolefin-based resin (for example, a polypropylene resin (PP)), a cellulose-based resin, a polyvinyl chloride-based resin, a cycloolefin-based resin, and the like. As the material constituting the resin substrate, among these, a polycarbonate-based resin is preferable.

The thickness of the substrate 2 is not particularly limited. However, in view of the balance between handleability and thinning, the thickness of the substrate 2 is preferably 0.01 to 0.5 mm, and more preferably 0.03 to 0.2 mm.

Furthermore, the substrate 2 may have a multi-layer structure. For example, the substrate 2 may include a functional film as one of the layers. The substrate itself may be a functional film.

In view of further inhibiting the breakage of the thin metal wires in a high-temperature and high-pressure process and/or in view of further improving the impact resistance, the modulus of elasticity of the substrate 2 at 25° C. is preferably 0.10 to 20.0 GPa, more preferably 0.10 to 10.0 GPa, and even more preferably 1.00 to 7.00 GPa. The method of measuring the modulus of elasticity of the substrate 2 at 25° C. is as described above.

<Interlayer 4>

The interlayer 4 is a layer for improving the adhesiveness between the substrate 2 and the patterned plating target layer 6.

In view of further inhibiting the breakage of the thin metal wires in the high-temperature and high-pressure process and/or in view of further improving the impact resistance, the modulus of elasticity of the interlayer 4 at 25° C. is preferably 0.005 to 5.00 GPa, more preferably 0.05 to 1.00 GPa, even more preferably 0.10 to 1.00 GPa, and particularly preferably 0.10 to 0.50 GPa. The method of measuring the modulus of elasticity of the interlayer 4 at 25° C. is as described above.

The thickness of the interlayer 4 is not particularly limited. Generally, the thickness of the interlayer 4 is preferably 0.01 to 50 μm, more preferably 0.1 to 15 μm, and even more preferably 0.2 to 5.0 μm.

The material of the interlayer 4 is not particularly limited, and examples thereof include a resin that exhibits excellent adhesiveness to the substrate.

Specifically, examples of such a resin include a polyurethane-based resin, a poly(meth)acrylic resin, a poly(meth)acrylamide-based resin, an epoxy-based resin, a phenolic resin, a polyimide-based resin, a polyester-based resin, a bismaleimide-based resin, a polyolefin-based resin, an isocyanate-based resin, a phenoxy-based resin, polyethersulfone, polysulfone, polyphenylenesulfone, polyphenylenesulfide, polyphenyl ether, polyetherimide, an acrylonitrile-butadiene-styrene copolymer (ABS resin), and the like.

As the material of the interlayer 4, in view of further inhibiting the breakage of the thin metal wires in a high-temperature and high-pressure process, a polyurethane-based resin and a poly(meth)acrylic resin are preferable, and a polyurethane-based resin is more preferable. Examples of the material for forming the polyurethane-based resin include AITRON Z-913-3 (manufactured by AICA Kogyo Co., Ltd.) and the like. Examples of the material for forming the poly(meth)acrylic resin include polyethylene glycol diacrylate and the like. As the polyethylene glycol diacrylate, for example, ARONIX M240 (manufactured by TOAGOSEI CO., LTD.) can be used.

<Patterned Plating Target Layer 6>

The patterned plating target layer 6 is disposed on the interlayer 4 and has a mesh-shaped pattern (mesh pattern). As will be described later, the patterned plating target layer 6 has a functional group that interacts with a plating catalyst or a precursor thereof. Therefore, by performing a plating treatment on the patterned plating target layer 6, the metal layer 8 can be formed on the patterned plating target layer 6. That is, the metal layer 8 having a mesh-shaped pattern can be formed.

Figure 2:
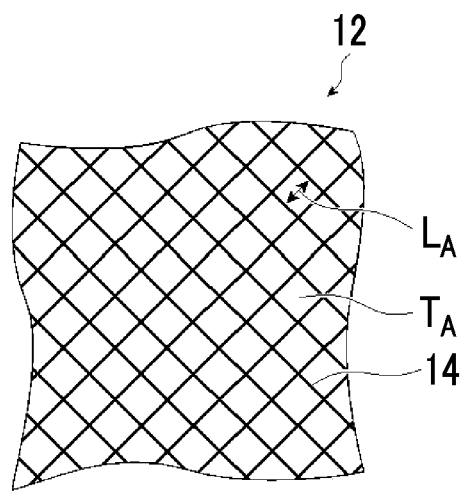
FIG. 2 is a cross-sectional view of the conductive member 12 taken along the line A-A.

FIG. 2 is a partially enlarged view of a cross section cut along the line A-A in FIG. 1. As shown in FIG. 2, the patterned plating target layer 6 is constituted with a plurality of thin wires 14 and disposed on the interlayer 4 as a mesh-shaped pattern including a plurality of opening portions $T_A$ formed of the crossing thin wires 14. In the patterned plating target layer 6 shown in FIG. 2, 4 thin wires 14 extend from one intersection point. However, the layer 6 is not limited to this aspect, and may have an aspect in which 3, 5, or more thin wires 14 extend from one intersection point.

The average thickness of the patterned plating target layer 6 is not particularly limited, but is preferably 0.05 to 100 μm, more preferably 0.07 to 10 μm, and even more preferably 0.1 to 3 μm.

The average thickness is an average obtained by observing the vertical cross section of the patterned plating target layer 6 with an electron microscope (for example, a scanning electron microscope), measuring the thickness at 10 random points, and calculating the arithmetic mean thereof.

The line width of the thin wires 14 constituting the mesh of the patterned plating target layer 6 is not particularly limited. However, in view of balance between the conduction characteristic and low visibility of the metal layer 8 to be formed on the patterned plating target layer 6, the line width of the thin wires 14 is preferably equal to or smaller than 30 μm, more preferably equal to or smaller than 15 μm, even more preferably equal to or smaller than 10 μm, and particularly preferably equal to or smaller than 5 μm. The line width is preferably equal to or greater than 0.5 μm, and more preferably equal to or greater than 1.0 μm.

The opening portion $T_A$ in FIG. 2 is substantially in a rhombic shape. However, the shape of $T_A$ is not limited thereto and may be other polygonal shapes (for example, a triangle, a quadrangle, a hexagon, or a random polygon). Furthermore, in addition to a straight line, a curve or an arc may be adopted as each side of $T_A$. In a case where each side of $T_A$ is an arc, for example, two opposite sides of $T_A$ may be arcs curved outward, and the other two sides may be arcs curved inward. Furthermore, each side of $T_A$ may be a wavy line in which an arc curved outward and an arc curved inward continue. It goes without saying that each side of $T_A$ may also be a sine curve.

A length $L_A$ of one side of the opening portion $T_A$ is not particularly limited. $L_A$ is preferably equal to or smaller than 1,500 μm, more preferably equal to or smaller than 1,300 μm, and even more preferably equal to or smaller than 1,000 μm. Furthermore, $L_A$ is preferably equal to or greater than 5 μm, more preferably equal to or greater than 30 μm, and even more preferably equal to or greater than 80 μm. In a case where the length of one side of the opening portion is within the above range, the transparency of the conductive member 12 is further improved.

<Metal Layer 8>

Figure 3:
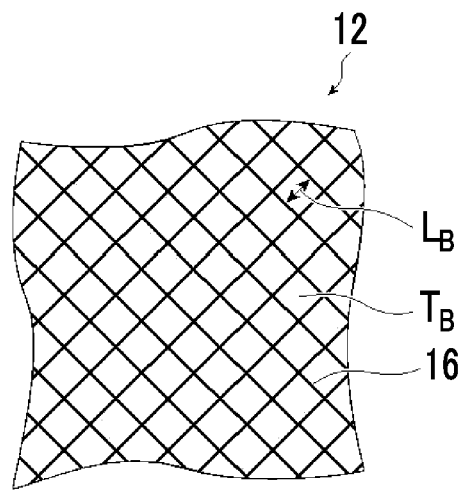
FIG. 3 is a cross-sectional view of the conductive member 12 taken along the line B-B.

FIG. 3 is a partially enlarged view of a cross section cut along the line B-B in FIG. 1. As described above, the metal layer 8 is disposed on the patterned plating target layer 6. As shown in FIG. 3, the metal layer 8 has a mesh-shaped pattern which is constituted with a plurality of thin metal wires 16 and includes a plurality of opening portions $T_B$ formed of the crossing thin metal wires 16. In the metal layer shown in FIG. 3, 4 thin metal wires 16 extend from one intersection point. However, the metal layer is not limited to this aspect, and may have an aspect in which 3, 5, or more thin metal wires 16 extend from one intersection point.

The average thickness of the metal layer 8 is not particularly limited, and can be selected from, for example, 0.00001 to 0.2 mm from the viewpoint of conductivity. The average thickness of the metal layer 8 is preferably equal to or smaller than 30 μm, more preferably equal to or smaller than 20 μm, even more preferably 0.01 to 9 μm, and particularly preferably 0.05 to 3 μm.

The average thickness of the metal layer 8 is an average obtained by observing the vertical cross section of the metal layer 8 with an electron microscope (for example, a scanning electron microscope), measuring the thickness at 10 random points, and calculating the arithmetic mean thereof.

The line width of the thin metal wires 16 constituting the mesh of the metal layer 8 is not particularly limited. The line width of the thin metal wires 16 is preferably equal to or smaller than 1,000 μm, more preferably equal to or smaller than 500 μm, and even more preferably equal to or smaller than 300 μm. Furthermore, the line width is preferably equal to or greater than 2 μm, and more preferably equal to or greater than 5 μm.

The line width of the thin metal wires 16 is determined by observing the wires 16 with an optical microscope using transmitted light.

The opening portion $T_B$ in FIG. 3 is substantially in a rhombic shape. However, the shape of $T_B$ is not limited thereto and may be other polygonal shapes (for example, a triangle, a quadrangle, a hexagon, or a random polygon). Furthermore, in addition to a straight line, a curve or an arc may be adopted as each side of $T_B$. In a case where each side of $T_B$ is an arc, for example, two opposite sides of $T_B$ may be arcs curved outward, and the other two sides may be arcs curved inward. Furthermore, each side of $T_B$ may be a wavy line in which an arc curved outward and an arc curved inward continue. It goes without saying that each side of $T_B$ may also be a sine curve.

A length $L_B$ of one side of the opening portion $T_B$ is not particularly limited. $L_B$ is preferably equal to or smaller than 1,500 μm, more preferably equal to or smaller than 1,300 μm, and even more preferably equal to or smaller than 1,000 μm. Furthermore, $L_B$ is preferably equal to or greater than 5 μm, more preferably equal to or greater than 30 μm, and even more preferably equal to or greater than 80 μm. In a case where the length of one side of the opening portion $T_B$ is within the above range, the transparency of the conductive member 12 which will be described later is further improved.

In view of further inhibiting the breakage of thin metal wires in a high-temperature and high-pressure process, the area ratio of the metal layer 8 is equal to or lower than 60%. Furthermore, in view of making it possible to form a conductive member having higher conductivity, the lower limit of the area ratio of the metal layer 8 is equal to or higher than 0.2%.

The area ratio of the metal layer 8 is determined by observing the conductive member 12 with an optical microscope using transmitted light.

Figure 4:
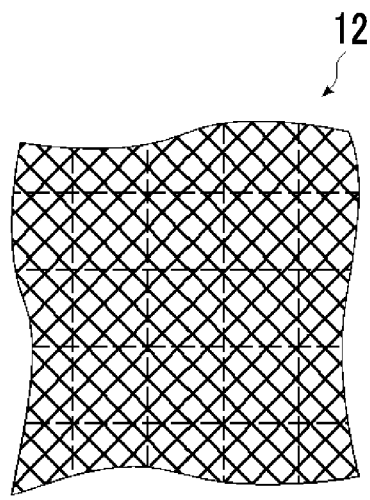
FIG. 4 is a schematic view showing a method of measuring an area ratio (%) of a metal layer 8 of the conductive member 12.

Specifically, as shown in FIG. 4, the mesh pattern of the metal layer 8 in the conductive member 12 is divided into square regions each having an area (hereinafter, also called "area X") 10 times the maximum area of an opening region, the area of a portion that appears as a dark field is divided by the area X for each region and then multiplied by 100, thereby calculating the area ratio (%). At this time, the value of the highest area ratio is defined as the area ratio (%) of the metal layer 8 of the conductive member 12. For example, in a case where the maximum area of an opening region is 250 μm$^2$, the metal layer is observed in each observation field, a square region (length: 50 μm, width: 50 μm) having an area of 2,500 μm$^2$ that is 10 times the maximum area, and the area ratio of the metal layer in each observation field is calculated.

In view of further improving conductivity, the area ratio (%) of the metal layer 8 is preferably 10% to 60%, more preferably 20% to 60%, and even more preferably 30% to 60%.

As the metal contained in the metal layer 8, known metals can be used without particular limitation.

As the main component (so-called base metal) contained in the metal layer 8, for example, metals such as copper, nickel, chromium, lead, gold, silver, tin, and zinc, and alloys of these metals are preferable. The main component means a metal whose content (mass) is the highest among the metals contained in the metal layer 8.

Particularly, in view of obtaining a conductive member having higher conductivity, the metal layer 8 preferably contains one or more metals selected from the group consisting of copper, nickel, and gold, and more preferably contains the above metal as a main component.

The content of the metal constituting the main component in the metal layer 8 is not particularly limited. Generally, the content of the metal with respect to the total mass of the metal layer 8 is preferably equal to or higher than 80% by mass, more preferably equal to or higher than 85% by mass, and even more preferably equal to or higher than 90% by mass.

<Protective Layer 10>

The protective layer 10 is a layer that mainly contributes to the improvement of the strength of the conductive member 12, the protection of the mesh-shaped metal layer 8, and/or the improvement of the adhesiveness to a resin layer applied by injection in preparing a molded article by using the conductive member 12.

In the conductive member 12 shown in FIG. 1, the protective layer 10 is disposed to cover the interlayer 4, the patterned plating target layer 6, and the mesh-shaped metal layer 8.

The modulus of elasticity of the protective layer 10 at 25° C. is 0.10 to 5.00 GPa. In view of further inhibiting the breakage of the thin metal wires in a high-temperature and high-pressure process and/or in view of further improving the impact resistance, the modulus of elasticity of the protective layer 10 at 25° C. is preferably 1.00 to 3.00 GPa.

The modulus of elasticity of the protective layer 10 at 25° C. means a value determined by cutting the conductive member 12 by using an ultramicrotome, taking the region of the protective layer 10 in the cut cross section as a measurement surface, and measuring a modulus of elasticity by using AFM in an environment of 25° C.

The protective layer 10 is preferably a layer containing a resin.

The type of resin forming the protective layer 10 is not particularly limited. Examples of the resin include known thermoplastic resins. Examples thereof include a polycarbonate-based resin, an acrylonitrile-butadiene-styrene copolymer (ABS resin), a polystyrene-based resin, a polyether sulfone-based resin, a poly(meth)acrylic resin, a polyurethane-based resin, a polyester-based resin (such as polyethylene terephthalate or polyethylene naphthalate), a polysulfone-based resin, a polyamide-based resin, a polyarylate-based resin, a polyolefin-based resin, a cellulose-based resin, a polyvinyl chloride-based resin, a cycloolefin-based resin, and the like. Particularly, the protective layer 10 preferably contains a polycarbonate-based resin, a polystyrene-based resin, or an ABS resin, and more preferably contains a polycarbonate-based resin.

The thickness of the protective layer 10 is not particularly limited. Generally, the thickness of the protective layer 10 is preferably 0.05 to 10 mm, more preferably 0.5 to 5 mm, and even more preferably 1 to 2 mm.

The resin forming the protective layer 10 may be fiber reinforced resins (Fiber Reinforced Plastics) containing fibers such as glass reinforced fibers and carbon fibers.

<Method for Manufacturing Conductive Member 12>

Hereinafter, an example of a method for manufacturing the conductive member 12 will be described.

<<Method for Forming Interlayer 4>>

The method for forming the interlayer 4 is not particularly limited. For example, a method may be used in which an interlayer forming composition containing materials (for example, the aforementioned urethane-based resin and the like) forming an interlayer is brought into contact with the substrate 2 so that a coating film is formed on the substrate 2. In a case where the interlayer forming composition contains a photocurable or thermosetting material, it is preferable to additionally cure the coating film.

Specific examples of other additives that can be contained in the interlayer forming composition include a polymerization initiator, a solvent, and the like. Examples of the polymerization initiator and the solvent that can be contained in the interlayer forming composition are the same as the examples of the polymerization initiator and the solvent that are contained in the plating target layer-forming composition which will be described later.

The substrate 2 is as described above.

<<Method for Forming Patterned Plating Target Layer 6>>

The method for forming the patterned plating target layer 6 is not particularly limited. However, it is preferable to use a method in which a plating target layer-forming composition containing the following compound X or composition Y is brought into contact with the substrate 2 on which the interlayer 4 is disposed (hereinafter, also called "substrate with an interlayer") so that a precursor layer of a plating target layer is formed on the interlayer in the substrate with an interlayer, energy is applied in the form of a pattern to the precursor layer of a plating target layer (for example, exposure), and development is performed to form the patterned plating target layer 6.

Compound X: a compound having a functional group that interacts with a plating catalyst or a precursor thereof (hereinafter, also simply called "interacting group") and a polymerizable group.

Composition Y: a composition containing a compound having a functional group that interacts with a plating catalyst or a precursor thereof and a compound having a polymerizable group.

Hereinafter, the above method will be specifically described. First, the materials used in this method will be specifically described, and then the procedure will be specifically described.

(Compound X)

The compound X is a compound having an interacting group and a polymerizable group.

The interacting group means a functional group capable of interacting with a plating catalyst or a precursor thereof applied to the patterned plating target layer. Examples of the interacting group include a functional group capable of electrostatically interacting with the plating catalyst or a precursor thereof, a nitrogen-containing functional group, a sulfur-containing functional group, and an oxygen-containing functional group that can be coordinated with the plating catalyst or a precursor thereof.

More specifically, examples of the interacting group include nitrogen-containing functional groups such as an amino group, an amide group, an imide group, a urea group, a tertiary amino group, an ammonium group, an amidino group, a triazine ring, a triazole ring, a benzotriazole group, an imidazole group, a benzimidazole group, a quinoline group, a pyridine group, a pyrimidine group, a pyrazine group, a quinazoline group, a quinoxaline group, a purine group, a triazine group, a piperidine group, a piperazine group, a pyrrolidine group, a pyrazole group, an aniline group, a group containing an alkylamine structure, a group containing an isocyanuric structure, a nitro group, a nitroso group, an azo group, a diazo group, an azido group, a cyano group, and a cyanate group; oxygen-containing functional groups such as an ether group, a hydroxyl group, a phenolic hydroxyl group, a carboxylic acid group, a carbonate group, a carbonyl group, an ester group, a group containing a N-oxide structure, a group containing a S-oxide structure, and a group containing a N-hydroxy structure; sulfur-containing functional groups such as a thiophene group, a thiol group, a thiourea group, a thiocyanuric acid group, a benzothiazole group, a mercaptotriazine group, a thioether group, a thioxy group, a sulfoxide group, a sulfone group, a sulfite group, a group containing a sulfoximine structure, a group containing a sulfoxonium salt structure, a sulfonic acid group, and a group containing a sulfonic acid ester structure; a phosphorus-containing functional groups such as a phosphate group, a phosphoramide group, a phosphine group, and a group containing a phosphoric acid ester structure; groups containing halogen atoms such as a chlorine atom and a bromine atom; and the like. In a case where these functional groups can be in a salt structure, the salt can also be used.

Among these, an ionic polar group such as a carboxylic acid group, a sulfonic acid group, a phosphoric acid group, or a boronic acid group, an ether group, or a cyano group is preferable, and a carboxylic acid group or a cyano group is more preferable, because these groups have high polarity and can be excellently adsorbed onto the plating catalyst, a precursor thereof, and the like.

The compound X may contain two or more interacting groups.

The polymerizable group is a functional group capable of forming a chemical bond by being applied with energy. Examples of the polymerizable group include a radically polymerizable group, a cationically polymerizable group, and the like. Among these, a radically polymerizable group is preferable because this group has higher reactivity. Examples of the radically polymerizable group include unsaturated carboxylic acid ester groups such as an acrylic acid ester group (acryloyloxy group), a methacrylic acid ester group (methacryloyloxy group), an itaconic acid ester group, a crotonic acid ester group, an isocrotonic acid ester group, and a maleic acid ester group, a styryl group, a vinyl group, an acrylamide group, a methacrylamide group, and the like. Among these, a methacryloyloxy group, an acryloyloxy group, a vinyl group, a styryl group, an acrylamide group, or a methacrylamide group is preferable.

The compound X may contain two or more polymerizable groups. The number of polymerizable groups contained in the compound X is not particularly limited, and may be one or two or greater.

The compound X may be a low-molecular-weight compound or a polymer compound. The low-molecular-weight compound means a compound having a molecular weight less than 1,000, and the polymer compound means a compound having a molecular weight equal to or higher than 1,000.

In a case where the compound X is a polymer, the weight-average molecular weight of the polymer is not particularly limited. However, in view of further improving handleability such as solubility, the weight-average molecular weight of the polymer is preferably 1,000 to 700,000, and more preferably 2,000 to 200,000. Particularly, from the viewpoint of polymerization sensitivity, the weight-average molecular weight of the polymer is more preferably equal to or higher than 20,000.

(Composition Y)

The composition Y is a composition containing a compound having an interacting group and a compound having a polymerizable group. That is, the precursor layer of a plating target layer contains two compounds consisting of a compound having an interacting group and a compound having a polymerizable group. The definitions of the interacting group and the polymerizable group are as described above.

The compound having an interacting group may be a low-molecular-weight compound or a polymer compound. Examples of suitable forms of the compound having an interacting group include polymers derived from unsaturated carboxylic acids (for example, acrylic acid, methacrylic acid, crotonic acid, isocrotonic acid, maleic acid, fumaric acid, itaconic acid, citraconic acid, and the like) and unsaturated carboxylic acid derivatives (for example, unsaturated carboxylic acid anhydrides, unsaturated carboxylic acid salts, unsaturated carboxylic acid monoesters, and the like). The compound having an interacting group does not contain a polymerizable group.

The compound having a polymerizable group is a so-called monomer. In view of further improving the hardness of the patterned plating target layer to be formed, the compound having a polymerizable group is preferably a polyfunctional monomer having 2 or more polymerizable groups. As the polyfunctional monomer, specifically, it is preferable to use a monomer having 2 to 6 polymerizable groups. From the viewpoint of molecular motility during a crosslinking reaction that affects the reactivity, the molecular weight of the polyfunctional monomer to be used is preferably 150 to 1,000, and more preferably 200 to 800.

The compound having a polymerizable group may contain an interacting group.

The mass ratio of the compound having an interacting group to the compound having a polymerizable group (mass of the compound having an interacting group/mass of the compound having a polymerizable group) is not particularly limited. However, in view of the balance between the strength and the plating suitability of the patterned plating target layer to be formed, the mass ratio is preferably 0.1 to 10, and more preferably 0.5 to 5.

If necessary, the plating target layer-forming composition may contain other components (for example, a polymerization initiator, a solvent, a sensitizer, a curing agent, a polymerization inhibitor, an antioxidant, an antistatic agent, a filler, particles, a flame retardant, a lubricant, a plasticizer, and the like).

The method for manufacturing the plating target layer-forming composition is not particularly limited. For example, known methods may be used. Examples thereof include a method of mixing together the aforementioned components at once, a method of mixing together the components in stages, and the like.

An example of suitable aspects of the plating target layer-forming composition will be described below.

(Plating Target Layer-Forming Composition)

It is preferable that the plating target layer-forming composition contain a polyfunctional radically polymerizable monomer and a polymer having a functional group interacting with a plating catalyst or a precursor thereof.

Polyfunctional Radically Polymerizable Monomer

The polyfunctional radically polymerizable monomer means a compound having 2 or more radically polymerizable groups. The number of radically polymerizable groups in the polyfunctional radically polymerizable monomer is not particularly limited, but is preferably 2 to 10, more preferably 2 to 5, and even more preferably 2.

The radically polymerizable group is not particularly limited, and examples thereof include an acryloyloxy group, a methacryloyloxy group, an acrylamide group, a methacrylamide group, a vinyl group, a styryl group, and the like. Among these, an acryloyloxy group, a methacryloyloxy group, an acrylamide group, or a methacrylamide group is preferable, and an acrylamide group or a methacrylamide group is more preferable.

The acryloyloxy group is a group represented by the following Formula (A). The methacryloyloxy group is a group represented by the following Formula (B). The acrylamide group is a group represented by the following Formula (C). The methacrylamide group is a group represented by the following Formula (D).

In Formulas (A) to (D), * represents a binding position.

In Formulas (C) and (D), R represents a hydrogen atom or a substituent. The type of the substituent is not particularly limited. Examples of the substituent include known substituents (for example, an aliphatic hydrocarbon group (such as an alkyl group) which may contain a heteroatom), an aromatic hydrocarbon group (such as an aryl group), and the like). R is preferably a hydrogen atom.

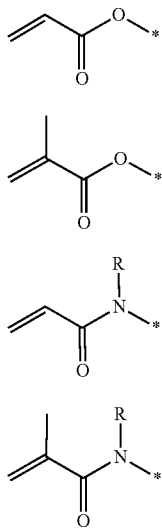

It is preferable that the polyfunctional radically polymerizable monomer have a polyoxyalkylene group.

The polyoxyalkylene group is a group having an oxyalkylene group as a repeating unit. The polyoxyalkylene group is preferably a group represented by Formula (E).

-(A-O)$_m$—   Formula (E)

A represents an alkylene group. The number of carbon atoms in the alkylene group is not particularly limited, but is preferably 1 to 4 and more preferably 2 or 3. For example, in a case where A is an alkylene group having 1 carbon atom, -(A-O)— represents an oxymethylene group (—CH$_2$O—); in a case where A is an alkylene group having 2 carbon atoms, -(A-O)— represents an oxyethylene group (—CH$_2$CH$_2$O—); and in a case where A is an alkylene group having 3 carbon atoms, -(A-O)— represents an oxypropylene group (—CH$_2$CH(CH$_3$)O—, —CH(CH$_3$)CH$_2$O—, or —CH$_2$CH$_2$CH$_2$O—). The alkylene group may be linear or branched.

m represents the number of repeating oxyalkylene groups, which is an integer equal to or greater than 2. The number of repeating oxyalkylene groups is not particularly limited, but is preferably 2 to 10 and more preferably 2 to 6.

In the plurality of oxyalkylene groups, the alkylene groups may have the same number of carbon atoms or different numbers of carbon atoms. For example, the group represented by Formula (E) contains a plurality of repeating units represented by -(A-O)—, and the alkylene groups in the repeating units may have the same number of carbon atoms or different numbers of carbon atoms. For instance, -(A-O)$_m$— may contain an oxymethylene group and an oxypropylene group.

In a case where -(A-O)$_m$— contains a plurality of types of oxyalkylene groups, the oxyalkylene groups may be bonded to each other in any order without particular limitation. The oxyalkylene groups may be arranged randomly or arranged to form a block.

As the polyfunctional radically polymerizable monomer, a difunctional acrylamide compound or a difunctional methacrylamide compound is preferable, and a compound represented by Formula (1) is more preferable.

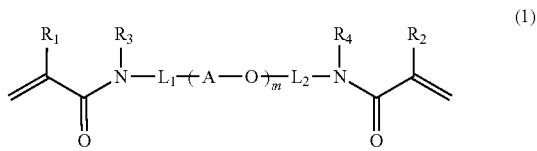

In Formula (1), R$_1$ and R$_2$ each independently represent a hydrogen atom or a methyl group.

A and m have the same definitions as A and m in Formula (E) described above.

R$_3$ and R$_4$ represent a hydrogen atom or a substituent.

The type of the substituent represented by R$_3$ and R$_4$ is the same as the type of the substituent represented by R in Formulas (C) and (D) described above, and the suitable aspects thereof are also the same.

As R$_3$ and R$_4$, a hydrogen atom is particularly preferable.

L$_1$ and L$_2$ each independently represent a single bond or a divalent linking group.

The type of the divalent linking group represented by L$_1$ and L$_2$ is not particularly limited. Examples of the divalent linking group include a divalent hydrocarbon group (this may be a divalent saturated hydrocarbon group or a divalent aromatic hydrocarbon group; the divalent saturated hydrocarbon group may be linear, branched, or cyclic and preferably has 1 to 20 carbon atoms, and examples thereof include an alkylene group; the divalent aromatic hydrocarbon group preferably has 5 to 20 carbon atoms, and examples thereof include a phenylene group; the divalent aromatic hydrocarbon group may also be an alkenylene group or an alkynylene group), a divalent heterocyclic group, —O—, —S—, —SO$_2$—, —NR$_{10}$—, —CO—(—C(=O)—), —COO—(—C(=O)O—), —NR$_{10}$—CO—, —CO—NR$_{10}$—, —SO$_3$—, —SO$_2$NR$_{10}$—, and a group obtained by combining two or more of these. R$_{10}$ represents a hydrogen atom or an alkyl group (preferably having 1 to 10 carbon atoms).

The hydrogen atom in the divalent linking group may be substituted with another substituent such as a halogen atom.

Various commercially available products can be used as the aforementioned polyfunctional radically polymerizable monomer. Furthermore, the polyfunctional radically polymerizable monomer can be synthesized by the methods described in Journal of Technical Disclosure No. 2013-502654, JP2014-193851A, and the like.

One polyfunctional radically polymerizable monomer may be used singly, or two or more polyfunctional radically polymerizable monomers may be used in combination.

The content of the polyfunctional radically polymerizable monomer in the plating target layer-forming composition (total content in a case where the composition contains a plurality of such monomers) is not particularly limited. In many cases, the content of the polyfunctional radically polymerizable monomer with respect to the total solid content of the composition is 10% to 90% by mass. In view of further suppressing the tackiness of the precursor layer of a plating target layer that will be described later, the content of the monomer with respect to the total solid content of the composition is preferably 15% to 85% by mass. In view of further improving the plating deposition property, the content of the monomer with respect to the total solid content of the composition is more preferably 15% to 75% by mass, and even more preferably 15% to 65% by mass. In the present specification, "solid content" means components constituting the patterned plating target layer 6, and does not include a solvent. Even though a component has the properties of a liquid, as long as the component is a constituent of the patterned plating target layer 6, the component is included in the solid content.

Polymer Having Functional Group (Interacting Group) Interacting with Plating Catalyst or Precursor Thereof The definition of the interacting group is as described above. As the interacting group, particularly, an ionic polar group such as a carboxylic acid group, a sulfonic acid group, a phosphoric acid group, or a boronic acid group or a cyano group is preferable, and a carboxylic acid group or a cyano group is more preferable, because these groups have high polarity and can be excellently adsorbed onto the plating catalyst, a precursor thereof, and the like.

The polymer may have two or more kinds of interacting groups.

The weight-average molecular weight of the polymer is not particularly limited. However, in view of further improving handleability, the weight-average molecular weight of the polymer is preferably 1,000 to 700,000, and more preferably 2,000 to 200,000.

It is preferable that the polymer contain a repeating unit having an interacting group.

A repeating unit represented by Formula (F) is an example of suitable aspects of the repeating unit having an interacting group.

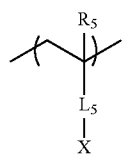

Formula (F)

In Formula (F), $R_5$ represents a hydrogen atom or an alkyl group (for example, a methyl group, an ethyl group, and the like).

$L_5$ represents a single bond or a divalent linking group. The divalent linking group has the same definition as the divalent linking group represented by $L_1$ and $L_2$ in Formula (1).

X represents an interacting group. The definition of the interacting group is as described above.

A repeating unit derived from an unsaturated carboxylic acid or a derivative thereof is another example of suitable aspects of the repeating unit having an interacting group.

The unsaturated carboxylic acid is an unsaturated compound having a carboxylic acid group (—COOH group). Examples of the derivative of the unsaturated carboxylic acid include an unsaturated carboxylic acid anhydride, an unsaturated carboxylic acid salt, an unsaturated carboxylic acid monoester, and the like.

Examples of the unsaturated carboxylic acid include acrylic acid, methacrylic acid, crotonic acid, isocrotonic acid, maleic acid, fumaric acid, itaconic acid, citraconic acid, and the like.

The content of the repeating unit having an interacting group in the polymer is not particularly limited. However in view of the balance between the stretchability and the plating deposition property of the patterned plating target layer 6, the content of the repeating unit having an interacting group with respect to the total content of repeating units is preferably 1 to 100 mol % and more preferably 10 to 100 mol %.

As an aspect of the polymer, for example, a polymer X is suitable which has a repeating unit derived from a conjugated diene compound and a repeating unit derived from an unsaturated carboxylic acid or a derivative thereof, because this polymer makes it easy to form the patterned plating target layer 6 with a small amount of energy applied (for example, an exposure amount).

The repeating unit derived from an unsaturated carboxylic acid or a derivative thereof is as described above.

The conjugated diene compound is not particularly limited as long as it is a compound having a molecular structure having two carbon-carbon double bonds separated by one single bond.

Examples of the conjugated diene compound include isoprene, 1,3-butadiene, 1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, 2,3-dimethyl-butadiene, 2-methyl-1,3-pentadiene, 3-methyl-1,3-pentadiene, 4-methyl-1,3-pentadiene, 2-phenyl-1,3-butadiene, 2-phenyl-1,3-pentadiene, 3-phenyl-1,3-pentadiene, 2,3-dimethyl-1,3-pentadiene, 4-methyl-1,3-pentadiene, 2-hexyl-1,3-butadiene, 3-methyl-1,3-hexadiene, 2-benzyl-1,3-butadiene, 2-p-tolyl-1,3-butadiene, and the like.

Among these, as the repeating unit derived from a conjugated diene compound, a repeating unit derived from a compound having a butadiene skeleton represented by the following Formula (2) is preferable, because this repeating unit makes it easy to synthesize the polymer X and further improves the characteristics of the patterned plating target layer 6.

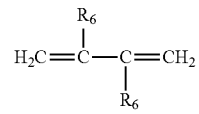

Formula (2)

In Formula (2), $R_6$ each independently represents a hydrogen atom, a halogen atom, or a hydrocarbon group. Examples of the hydrocarbon group include an aliphatic hydrocarbon group (for example, an alkyl group, an alkenyl group, or the like preferably having 1 to 12 carbon atoms) and an aromatic hydrocarbon group (for example, a phenyl group, a naphthyl group, or the like). The plurality of $R_6$'s may be the same or different from each other.

Examples of the compound having a butadiene skeleton represented by Formula (2) (monomer having a butadiene structure) include 1,3-butadiene, isoprene, 2-ethyl-1,3-butadiene, 2-n-propyl-1,3-butadiene, 2,3-dimethyl-1,3-butadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene, 2-cyano-1,3-butadiene, and the like.

In the polymer X, the content of the repeating unit derived from a conjugated diene compound is preferably 25 to 75 mol % with respect to the total content of repeating units.

In the polymer X, the content of the repeating unit derived from an unsaturated carboxylic acid or a derivative thereof is preferably 25 to 75 mol % with respect to the total content of repeating units.

The content of the polymer in the plating target layer-forming composition is not particularly limited. In many cases, the content of the polymer is 10% to 90% by mass with respect to the total solid content of the composition. In view of further suppressing the tackiness of the precursor layer of a plating target layer that will be described later, the content of the polymer is preferably 15% to 85% by mass with respect to the total solid content of the composition. In view of further improving the balance between the stretchability and the plating deposition property of the plating target layer, the content of the polymer is more preferably 25% to 75% by mass, and even more preferably 35% to 65% by mass.

The mass ratio of the polymer to the polyfunctional radically polymerizable monomer (mass of the polymer/mass of the polyfunctional radically polymerizable monomer) is not particularly limited, and is 0.1 to 10 in many cases. The mass ratio is preferably 0.3 to 3, and more preferably 0.4 to 1.5.

Other Components

The plating target layer-forming composition may contain components other than the polyfunctional radically polymerizable monomer and the polymer described above. Hereinafter, the optional components will be specifically described.

Surfactant

The plating target layer-forming composition may contain a surfactant.

The type of the surfactant is not particularly limited. Examples of the surfactant include a fluorine-based surfactant, a nonionic surfactant, a cationic surfactant, an anionic surfactant, a silicone-based surfactant, and the like. Among these, in view of further suppressing the tackiness of the precursor layer of a plating target layer, a fluorine-based surfactant or a silicone-based surfactant is preferable, and a fluorine-based surfactant is more preferable.

One surfactant may be used singly, or two or more surfactants may be used in combination.

Examples of the fluorine-based surfactant include W-AHE and W-AHI (manufactured by FUJIFILM Corporation), MEGAFACE F171, MEGAFACE F172, MEGAFACE F173, MEGAFACE F176, MEGAFACE F177, MEGAFACE F141, MEGAFACE F142, MEGAFACE F143, MEGAFACE F144, MEGAFACE R30, MEGAFACE F437, MEGAFACE F475, MEGAFACE F479, MEGAFACE F482, MEGAFACE F554, MEGAFACE F569, MEGAFACE F780, and MEGAFACE F781F (manufactured by DIC Corporation), FLUORAD FC430, FLUORAD FC431, and FLUORAD FC171. (manufactured by 3M Japan Limited.), SURFLON S-382, SURFLON SC-101, SURFLON SC-103, SURFLON SC-104, SURFLON SC-105, SURFLON SC1068, SURFLON SC-381, SURFLON SC-383, SURFLON S393, and SURFLON KH-40 (manufactured by AGC Inc.), PF636, PF656, PF6320, PF6520, and PF7002 (manufactured by OMNOVA Solutions Inc.), and the like.

The content of the surfactant in the plating target layer-forming composition is not particularly limited. The content of the surfactant with respect to the total amount of 100% by mass of the plating target layer-forming composition is preferably 0.005% to 0.5% by mass, more preferably 0.01% to 0.2% by mass, and even more preferably 0.01% to 0.1% by mass.

Polymerization Initiator

The plating target layer-forming composition may contain a polymerization initiator.

The type of the polymerization initiator is not particularly limited. Examples of the polymerization initiator include known polymerization initiators (preferably photopolymerization initiators). Examples of the polymerization initiator include benzophenones, acetophenones, α-aminoalkylphenones, benzoins, ketones, thioxanthones, benzyls, benzyl ketals, oxime esters, bisacylphosphine oxides, acylphosphine oxides, anthraquinones, and azos.

The content of the polymerization initiator in the plating target layer-forming composition is not particularly limited. The content of the polymerization initiator with respect to 100% by mass of the compound having a polymerizable group in the plating target layer-forming composition is preferably 0.1% to 20% by mass, and more preferably 0.5% to 10% by mass.

Solvent

The plating target layer-forming composition may contain a solvent.

The type of the solvent is not particularly limited. Examples of the solvent include water and an organic solvent. Examples of the organic solvent include known organic solvents (for example, an alcohol-based solvent, an ester-based solvent, a ketone-based solvent, a halogen-based solvent, a hydrocarbon-based solvent, and the like).

If necessary, the plating target layer-forming composition may contain other components (for example, a sensitizer, a curing agent, a polymerization inhibitor, an antioxidant, an antistatic agent, a filler, a flame retardant, a lubricant, a plasticizer, or a plating catalyst or a precursor thereof).

(Method for Forming Patterned Plating Target Layer 6)

The patterned plating target layer 6 can be formed using the plating target layer-forming composition described above.

As the method for forming the patterned plating target layer 6, a method having the following steps is preferable.

Step 1-1: a step of bringing the substrate with an interlayer into contact with the plating target layer-forming composition so that the precursor layer of a plating target layer is formed on the surface of the interlayer 4 in the substrate with an interlayer.

Step 1-2: a step of performing an exposure treatment in the form of a pattern on the precursor layer of a plating target layer.

Step 1-3: a step of performing a developing treatment on the precursor layer of a plating target layer having undergone exposure so that the patterned plating target layer 6 is formed.

Hereinafter, the steps 1-1 to 1-3 will be specifically described.

The step 1-1 is a step of bringing the substrate with an interlayer into contact with the plating target layer-forming composition so that the precursor layer of a plating target layer is formed on the substrate with an interlayer. By performing this step, a substrate with a precursor layer of a plating target layer is obtained which has a substrate with an interlayer and a precursor layer of a plating target layer disposed on the surface of the interlayer 4 in the substrate with an interlayer.

The precursor layer of a plating target layer is a layer that has not yet been subjected to an exposure treatment.

The method of bringing the substrate with an interlayer into contact with the plating target layer-forming composition is not particularly limited. Examples thereof include a method of coating the substrate with an interlayer with the plating target layer-forming composition and a method of immersing the substrate with an interlayer in the plating target layer-forming composition.

After the substrate with an interlayer is brought into contact with the plating target layer-forming composition, if necessary, a drying treatment may be performed so as to remove the solvent from the precursor layer of a plating target layer.

The step 1-2 is a step of bringing a mask, which has opening portions having a predetermined shape, into close contact with the precursor layer of a plating target layer and performing an exposure treatment in the form of a mesh pattern on the precursor layer of a plating target layer. By the exposure treatment, the polymerizable groups contained in the compounds in the precursor layer of a plating target layer are activated. As a result, crosslinks are formed between the compounds, and the layer is cured. During the exposure treatment, a heating treatment may be performed.

Examples of light sources of the exposure treatment include a mercury lamp, a metal halide lamp, a xenon lamp, a chemical lamp, a carbon arc lamp, and the like. Furthermore, electron beams, X-rays, ion beams, far infrared rays, and the like can also be used.

The exposure time is not particularly limited, and is, for example, 10 seconds to 5 hours. The exposure energy is not particularly limited and may be about 10 to 8,000 mJ.

The step 1-3 is a step of performing a developing treatment on the precursor layer of a plating target layer having undergone exposure treatment in the form of a mesh pattern. Through the step 1-3, the patterned plating target layer 6 is formed.

The method of the developing treatment is not particularly limited. According to the type of materials used, the optimal developing treatment is performed. Examples of developers include an organic solvent, pure water, and an alkaline aqueous solution.

By the above method, the patterned plating target layer 6 obtained by the curing of the plating target layer-forming composition is disposed on the substrate with an interlayer. That is, a substrate with a plating target layer is formed which has the substrate with an interlayer and the patterned plating target layer 6 disposed on the surface of the interlayer 4 in the substrate with an interlayer. The patterned plating target layer 6 has a mesh-shaped pattern which is constituted with a plurality of thin wires and includes a plurality of opening portions formed of the crossing thin wires.

The method for forming the patterned plating target layer 6 is not limited to the method described above. The patterned plating target layer 6 may also be formed by a method of disposing the precursor layer of a plating target layer in the form of a pattern on the substrate 2 and performing a curing treatment on the patterned precursor layer of a plating target layer so as to form the patterned plating target layer 6. The precursor layer of a plating target layer can be disposed in the form of a pattern, for example, by a method of applying the plating target layer-forming composition to a predetermined position on the substrate 2 by a screen printing method or an inkjet method.

<<Method for Forming Metal Layer 8>>

By performing a plating treatment on the patterned plating target layer 6 in the aforementioned substrate with a plating target layer, a metal layer 8 matching with the mesh pattern of the patterned plating target layer 6 can be formed on the patterned plating target layer 6.

The method for forming the metal layer 8 is not particularly limited, but it is preferable to perform the following steps 2-1 and 2-2.

Step 2-1: a step of applying a plating catalyst or a precursor thereof to the patterned plating target layer 6.

Step 2-2: a step of performing a plating treatment on the patterned plating target layer 6 to which the plating catalyst or a precursor thereof is applied.

Hereinafter, the procedures of the steps 2-1 and 2-2 will be specifically described.

The step 2-1 is a step of applying a plating catalyst or a precursor thereof to the patterned plating target layer 6. The patterned plating target layer 6 contains the aforementioned interacting group. Therefore, according to its function, the interacting group allows the applied plating catalyst or a precursor thereof to adhere to (be adsorbed onto) the interacting group.

The plating catalyst or a precursor thereof functions as a catalyst or electrode for the plating treatment. Therefore, the type of the plating catalyst or a precursor thereof to be used is appropriately determined according to the type of the plating treatment.

The plating catalyst or a precursor thereof is preferably an electroless plating catalyst or a precursor thereof.

The electroless plating catalyst is not particularly limited as long as it functions as an active nucleus during electroless plating. Examples of the electroless plating catalyst include metals having catalytic activity in an autocatalytic reduction reaction (metals which are known to have ionization tendency lower than that of Ni and can be subjected to electroless plating). Specific examples thereof include Pd, Ag, Cu, Pt, Au, Co, and the like.

A metal colloid may be used as the electroless plating catalyst.

The electroless plating catalyst precursor is not particularly limited as long as it turns into an electroless plating catalyst by a chemical reaction. Examples of the electroless plating catalyst precursor include ions of the metals listed above as the electroless plating catalyst.

The plating catalyst or a precursor thereof may be applied to the plating target layer, for example, by a method of preparing a solution by means of dispersing or dissolving the plating catalyst or a precursor thereof in a solvent and coating the patterned plating target layer 6 with the solution, or a method of immersing the substrate with a plating target layer in the solution.

Examples of the solvent include water and an organic solvent.

The step 2-2 is a step of performing a plating treatment on the patterned plating target layer 6 to which a plating catalyst or a precursor thereof is applied.

The method of the plating treatment is not particularly limited, and examples thereof include an electroless plating treatment and an electrolytic plating treatment (electroplating treatment). In the present step, the electroless plating treatment may be performed alone, or the electrolytic plating treatment may be additionally performed after the electroless plating treatment.

Hereinafter, the procedures of the electroless plating treatment and the electrolytic plating treatment will be specifically described.

The electroless plating treatment is a treatment for depositing a metal by a chemical reaction using a solution in which metal ions to be deposited as plating are dissolved.

It is preferable that the electroless plating treatment be performed, for example, according to a procedure in which a substrate with a plating target layer applied with an electroless plating catalyst is rinsed with water so that an excess of electroless plating catalyst is removed, and then the substrate is immersed in an electroless plating bath. As the electroless plating bath, known electroless plating baths can be used.

Generally, an electroless plating bath mainly contains, in addition to a solvent (for example, water), metal ions for plating, a reducing agent, and an additive (stabilizer) for improving the stability of the metal ions.

In a case where a plating catalyst or a precursor thereof applied to the patterned plating target layer 6 has the function of an electrode, it is possible to perform the electrolytic plating treatment on the patterned plating target layer 6 to which the catalyst or a precursor thereof is applied.

As described above, after the aforementioned electroless plating treatment, if necessary, the electrolytic plating treatment can be performed. In this embodiment, the thickness of the metal layer 8 to be formed can be appropriately adjusted.

In the embodiment described so far, the step 2-1 is performed. However, in a case where the patterned plating target layer 6 contains a plating catalyst or a precursor thereof, the step 2-1 may not be performed.

By performing the above treatment, the metal layer 8 is formed on the patterned plating target layer 6. That is, a substrate with a metal layer is obtained which includes a substrate with a plating target layer and a mesh-shaped metal layer 8 disposed on the patterned plating target layer 6 in the substrate with a plating target layer.

Furthermore, in a case where the above steps 2-1 and 2-2 are performed using a three-dimensional substrate with a plating target layer, a three-dimensional conductive member can be obtained.

<<Method for Forming Protective Layer 10>>

The method for forming the protective layer 10 is not particularly limited. For example, a method may be used in which a protective layer forming composition containing the aforementioned resin and additives used if necessary (for example, light-transmitting particles, a solvent, and the like) is brought into contact with the substrate with a metal layer so that a coating film is formed on the surface of the metal layer 8 on the substrate with a metal layer, and the coating film is cured if necessary so that a protective layer is formed.

Other Embodiments

The conductive member according to an embodiment of the present invention is not limited to the first embodiment described above. In the first embodiment, the interlayer, the patterned plating target layer, the metal layer, and the protective layer are arranged on one surface of the substrate. However, in the conductive member according to an embodiment of the present invention, the interlayer, the patterned plating target layer, the metal layer, and the protective layer may be arranged on both surfaces of the substrate.

[Molded Article and Method for Manufacturing Molded Article]

In a case where the conductive member is applied to a touch panel sensor, from the viewpoint of strengthening the conductive member, a resin layer may be laminated on the protective layer of the conductive member.

Hereinafter, a molded article having a conductive member and a resin layer disposed on the protective layer of the conductive member will be described.

As the resin forming the resin layer, known resins can be used without particular limitation. Examples of the resins include a polyether sulfone-based resin, a poly(meth)acrylic resin, a polyurethane-based resin, a polyester-based resin (such as polyethylene terephthalate or polyethylene naphthalate), a polycarbonate-based resin, a polysulfone-based resin, a polyamide-based resin, a polyarylate-based resin, a polyolefin-based resin, a cellulose-based resin, a polyvinyl chloride-based resin, a cycloolefin-based resin, and the like.

An example of the method for forming a molded article will be described below.

It is preferable that the method for forming a molded article include steps of disposing the conductive member on one of a first mold and a second mold capable of forming a mold cavity so that the substrate of the conductive member and one of the molds face each other (in other words, the substrate of the conductive member faces one of the molds), clamping the first mold and the second mold together, and injecting a resin into the mold cavity formed by the first mold and the second mold so as to obtain a molded article including the conductive member and a resin layer.

Generally, in the injecting step, the resin is heated by a known heating unit, and then the resulting molten resin is injected into the mold cavity. Furthermore, the mold (the first mold and/or the second mold) may also be heated by a known heating unit. The resin is as described above.

Then, if necessary, the mold is cooled to solidify the resin, and the molded article is taken out of the mold.

The shape of the mold is not particularly limited, and a mold having an optimal shape is selected according to the shape of the conductive member. For example, in a case where the conductive member has a three-dimensional shape (solid shape), a mold having a shape matching with the three-dimensional shape of the conductive member is selected.

[Use]

The conductive member is applicable to various uses. For example, the conductive member is applicable to a wide variety of uses such as touch panel sensors, semiconductor chips, Flexible printed circuits (FPC), Chip on Film (COF), Tape Automated Bonding (TAB), antennas, multilayer circuit boards, and motherboards. Particularly, it is preferable to use the conductive member in a touch panel sensor (particularly, a capacitive touch panel sensor).

Figure 5:
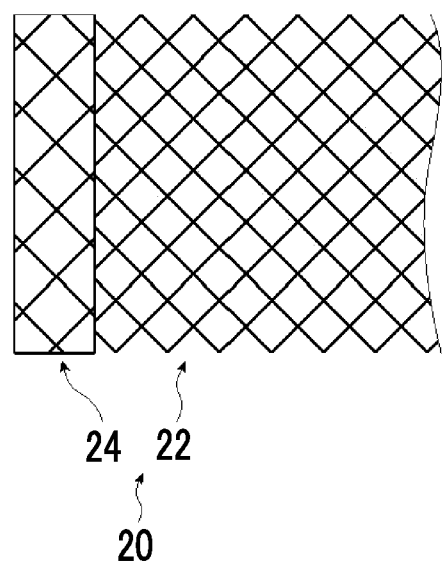
FIG. 5 is a schematic view showing an example of an aspect in which a conductive member is used in a touch panel sensor.

In a case where the conductive member is applied to a touch panel sensor, for example, as shown in FIG. 5, it is possible to cause a mesh-shaped metal layer 20 in the conductive member to function as an electrode terminal 24 electrically connected to an electrode pattern 22 and the end portions of the electrode pattern 22. Such a touch panel sensor can be suitably applied to a touch panel.

The conductive member can also be used as a heating element. For example, by applying an electric current to the metal layer, the temperature of the metal layer rises, and the metal layer thus functions as an electric heating wire.

EXAMPLES

Hereinafter, the present invention will be more specifically described based on examples. The materials, amounts and proportions of the materials used, details of treatments, procedures of treatments, and the like described in the following examples can be appropriately changed unless the change is away from the gist of the present invention.

Therefore, the scope of the present invention should not be narrowly interpreted by the following examples.

Example 1

[Preparation of Plating Target Layer-Forming Composition A]

By mixing together the following components, a plating target layer-forming composition A was obtained.

| | |
|---|---|
| Aqueous solution of polybutadiene maleic acid (butadiene-maleic acid copolymer) (manufactured by FUJIFILM Wako Pure Chemical Corporation; 42% by mass aqueous solution) | 6 parts by mass |
| Difunctional acrylamide monomer (AA) having the following structure | 2.5 parts by mass |
| Omnirad 127 (manufactured by IGM Resins) | 0.13 parts by mass |
| Isopropanol (IPA) | 91.5 parts by mass |

(Difunctional Acrylamide Monomer (AA))

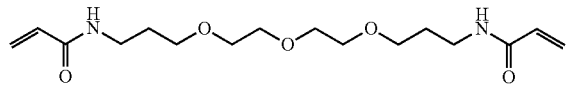 [SMILES: C=CC(=O)NCCCOCCOCCOCCCNC(=O)C=C]

A difunctional acrylamide monomer synthesized by the method described in paragraph [0099] of JP2014-193851A was used.

[Preparation of Interlayer Forming Composition A]

By mixing together the following components, an interlayer forming composition A was obtained.

| | |
|---|---|
| AITRON Z-913-3 (manufactured by AICA Kogyo Co., Ltd.) | 4% by mass |
| Mixed solvent of isopropanol (IPA) and 1-methoxy-2-propanol (MFG) (IPA:MFG (mass ratio) = 3:1) | 96% by mass |

[Preparation of protective layer forming composition A]

By mixing together the following components, a protective layer forming composition A was obtained.

| | |
|---|---|
| IMB-006 (manufactured by Teikoku Printing Inks Mfg. Co., Ltd) | 40% by mass |
| Toluene | 60% by mass |

[Manufacturing of Conductive Member]

<Formation of Patterned Plating Target Layer>

By using a bar coater, a substrate (polycarbonate-based resin (PC) film manufactured by TEIJIN LIMITED., Panlite PC, thickness: 250 μm) was coated with the interlayer forming composition A. Then, the formed layer of the interlayer forming composition was irradiated with ultraviolet rays (UV), thereby forming an interlayer (film thickness: 0.8 μm). That is, a substrate with an interlayer was obtained which had a substrate and an interlayer disposed on the substrate.

Thereafter, by using a bar coater, the interlayer was coated with the plating target layer-forming composition to form a film having a thickness of 0.8 μm, thereby obtaining a precursor layer of a plating target layer. That is, a substrate with a precursor layer of a plating target layer was obtained which had the substrate with an interlayer and the precursor layer of a plating target layer disposed on the interlayer.

Then, in order to form a mesh-patterned metal layer having an area ratio of 60%, the precursor layer of a plating target layer was exposed (0.2 J/cm$^2$) to a metal halide light source through a quartz mask having a predetermined opening pattern.

After being exposed, the precursor layer of a plating target layer having undergone exposure was rinsed with water at room temperature by shower and subjected to a developing treatment, thereby obtaining a plating target layer that was in the form of a square pattern with a line width of 10 μm (patterned plating target layer).

<Formation of Metal Layer>

Subsequently, the substrate with the patterned plating target layer was immersed in a 1% by mass aqueous sodium carbonate solution at room temperature for 5 minutes, taken out of the solution, and rinsed twice with pure water.

Thereafter, the substrate with a plating target layer was immersed in pure water for 5 minutes, then immersed in a Pd catalyst application solution (OMNISHIELD 1573 ACTIVATOR, manufactured by Rohm and Haas Electronic Materials LLC.) at 30° C. for 5 minutes, taken out of the solution, and then rinsed twice with pure water. Subsequently, the obtained substrate with a plating target layer was immersed in a reducing solution (CIRCUPOSIT P13 oxide converter 60C, manufactured by Rohm and Haas Electronic Materials LLC.) at 30° C. for 5 minutes, then taken out of the solution, and rinsed twice with pure water. Thereafter, the obtained substrate with a plating target layer was immersed in an electroless plating solution (CIRCU-POSIT 4500, manufactured by Rohm and Haas Electronic Materials LLC.) at 45° C. for 15 minutes, then taken out of the solution, and rinsed with pure water, thereby obtaining a substrate with a metal layer having a thickness of 3 μm and an area ratio of 60%.

The obtained substrate with a metal layer was cut with a microtome so as to obtain a cross section, and the plating target layer as the underlayer of the metal layer was evaluated based on a microscopic infrared absorption spectrum. As a result, a functional group was detected which interacts with a plating catalyst or a precursor thereof contained in the plating target layer-forming composition.

<Formation of Protective Layer>

By using a bar coater, the surface of the metal layer included in the substrate with a metal layer was coated with the protective layer forming composition A to form a film having a thickness of 5 μm, thereby obtaining a protective layer. That is, a conductive member was obtained which has a substrate with a metal layer and a protective layer disposed on the metal layer.

Example 2

[Preparation of Interlayer Forming Composition B]

By mixing together the following components, an interlayer forming composition B was obtained.

| | |
|---|---|
| Polyethylene glycol diacrylate (trade name: ARONIX M240 (manufactured by TOAGOSEI CO., LTD.)) | 4% by mass |
| Mixed solvent of isopropanol (IPA) and 1-methoxy-2-propanol (MFG) (IPA:MFG (mass ratio) = 3:1) | 96% by mass |

Example 2

A conductive member of Example 2 was prepared in the same manner as in Example 1, except that the interlayer forming composition A was changed to the interlayer forming composition B.

Example 3

A conductive member of Example 3 was prepared in the same manner as in Example 1, except that in <Formation of patterned plating target layer>, in order to form a mesh-patterned metal layer having an area ratio of 40%, the precursor layer of a plating target layer was exposed (0.2 J/cm$^2$) to a metal halide light source through a quartz mask having a predetermined opening pattern.

Example 4

A conductive member of Example 4 was prepared in the same manner as in Example 1, except that the protective layer was changed to a polystyrene-isoprene copolymer (trade name: SEPTON 2104 (manufactured by KURARAY CO., LTD.)).

Example 5

A conductive member of Example 5 was prepared in the same manner as in Example 1, except that the protective layer was changed to a glass-reinforced fiber-containing thermoplastic resin (see Japanese Patent No. JP2010258791A).

Example 6

A conductive member of Example 6 was prepared in the same manner as in Example 1, except that the protective layer was changed to polystyrene (trade name: DICSTYRENE GPPS-CR3500 (manufactured by DIC Corporation)).

Example 7

A conductive member of Example 7 was prepared in the same manner as in Example 1, except that the protective layer was changed to transparent ABS (trade name: TE30S (manufactured by Denka Company Limited.)).

Example 8

[Preparation of Interlayer Forming Composition C]

By mixing together the following components, an interlayer forming composition C was obtained.

| | |
|---|---|
| AITRON Z-913-3 (manufactured by AICA Kogyo Co., Ltd.) | 3.5% by mass |
| Difunctional acrylamide monomer (AA) described above | 0.5% by mass |
| Mixed solvent of isopropanol (IPA) and 1-methoxy-2-propanol (MFG) (IPA:MFG (mass ratio) = 3:1) | 96% by mass |

A conductive member of Example 8 was prepared in the same manner as in Example 1, except that the substrate was changed to PP (PURETHERMO AG356AS (manufactured by Idemitsu Unitech Co., Ltd.)), and the interlayer forming composition C was used for the interlayer.

Example 9

A conductive member of Example 9 was prepared in the same manner as in Example 1, except that in forming the patterned plating target layer, in order to form a mesh-patterned metal layer having an area ratio of 0.2%, the quartz mask having a predetermined opening pattern was changed.

Example 10

A conductive member of Example 10 was prepared in the same manner as in Example 1, except that the thickness of the interlayer was changed to 0.2 µm.

Example 11

A conductive member of Example 11 was prepared in the same manner as in Example 1, except that the thickness of the interlayer was changed to 5 µm.

Comparative Example 1

[Preparation of Interlayer Forming Composition C]

By mixing together the following components, an interlayer forming composition C was obtained.

| | |
|---|---|
| Dipentaerythritol hexaacrylate (trade name: A-DPH (manufactured by SHIN-NAKAMURA CHEMICAL CO, LTD.)) | 4% by mass |
| Mixed solvent of isopropanol (IPA) and 1-methoxy-2-propanol (MFG) (IPA:MFG (mass ratio) = 3:1) | 96% by mass |

A conductive member of Comparative Example 1 was prepared in the same manner as in Example 1, except that the interlayer forming composition A was changed to the interlayer forming composition C.

Comparative Example 2

[Preparation of Interlayer Forming Composition D]
By mixing together the following components, an interlayer forming composition D was obtained.
Hydrogenated nitrile rubber (HNBR, trade name: Zetpol (manufactured by ZEON CORPORATION.)) 4% by mass
Mixed solvent of isopropanol (IPA) and 1-methoxy-2-propanol (MFG) (IPA:MFG (mass ratio)=3:1) 96% by mass
A conductive member of Comparative Example 2 was prepared in the same manner as in Example 1, except that the interlayer forming composition A was changed to the interlayer forming composition D.

Comparative Example 3

A conductive member of Comparative Example 3 was prepared in the same manner as in Example 1, except that in <Formation of patterned plating target layer>, in order to form a mesh-patterned metal layer having an area ratio of 90%, the precursor layer of a plating target layer was exposed (0.2 J/cm$^2$) to a metal halide light source through a quartz mask having a predetermined opening pattern.

Comparative Example 4

[Preparation of Protective Layer Forming Composition B]
By mixing together the following components, a protective layer forming composition B was obtained.

| | |
|---|---|
| SilFort PHC587 (manufactured by Momentive Performance Materials Inc.) | 40% by mass |
| Isopropanol | 60% by mass |

A conductive member of Comparative Example 4 was prepared in the same manner as in Example 1, except that the protective layer forming composition A was changed to the protective layer forming composition B.

[Various Evaluations]
By using the conductive members obtained in the examples and comparative examples described above, the following various evaluations were performed. The results are summarized in Table 1 that will be described later.

[Area Ratio of Metal Layer in Conductive Member]
The mesh-shaped metal layer, which was included in each of the conductive members of the examples and the comparative examples and constituted with a plurality of crossing thin metal wires, was observed with an optical microscope using transmitted light, and the area ratio (%) of the metal layer in each of the conductive members was measured.

Specifically, the mesh pattern constituting the metal layer of the conductive member was divided into square regions each having an area ("area X") 10 times the maximum area of the opening region, the area of a portion that appeared as a dark field was divided by the area X for each region and then multiplied by 100, thereby calculating the area ratio (%). At this time, the value of the highest area ratio is defined as the area ratio (%) of the metal layer of the conductive member.

[Measurement of Modulus of Elasticity of Interlayer, Substrate, and Protective Layer at 25° C.]
Each of the conductive members of the examples and comparative examples was cut with an ultramicrotome so as to obtain a cross section. The cross section was adopted as a measurement surface, and the measurement sample was fixed to a support by using a pressure sensitive adhesive tape. Then, By using AFM (MFP-3D INFINITY type AFM manufactured by Oxford Instruments Asylum Research Inc.), the modulus of elasticity of the interlayer at 25° C., the modulus of elasticity of the substrate at 25° C., and the modulus of elasticity of the protective layer at 25° C. were measured.

[Evaluation]
<Whether or not Wire Breakage Occurs in High-Temperature and High-Pressure Process>
Each of the conductive members of the examples and comparative examples was mounted on molds capable of forming a mold cavity. At this time, the conductive member was mounted so that the surface on the substrate side came into contact with the molds. Then, the molds were clamped together, a resin (manufactured by TEIJIN LIMITED., Panlite L-1225L) was injection-molded in the mold cavity at a temperature of 300° C., thereby obtaining a 50 mm×70 mm×2 mm molded article. For the obtained molded article, the mesh-shaped metal layer was observed at 10 random points so as to check whether or not wire breakage occurred, and the molded article was evaluated based on the following evaluation standard. For practical use, a molded article graded B or higher is preferable.
"A": Wire breakage does not occur.
"B": Although wire breakage does not occur, the metal layer is found to be partially damaged.
"C": Wire breakage occurs.

<Impact Resistance>
From the height of 50 cm, a steel ball weighing 500 g was dropped to the substrate of each of the conductive members of the examples and comparative examples. Then, the mesh-shaped metal layer of each of the conductive members was observed at 10 random points so as to check whether or not wire breakage occurred, and the conductive member was evaluated based on the following evaluation standard. For practical use, a conductive member graded B or higher is preferable.
"A": Wire breakage does not occur.
"B": Although wire breakage does not occur, the metal layer is found to be partially damaged.
"C": Wire breakage occurs.

Table 1 is shown below.
In Table 1, "Ratio of modulus of elasticity of interlayer to substrate (b/a)" means "modulus of elasticity of interlayer at 25° C. (b)/modulus of elasticity of substrate at 25° C. (a)".
Furthermore, in Table 1, "PC" means a polycarbonate-based resin, and "PP" means a polypropylene resin.

TABLE 1

|  |  | Example 1 | Example 2 | Example 3 | Example 4 | Example 5 | Example 6 |
|---|---|---|---|---|---|---|---|
| | Substrate | PC | PC | PC | PC | PC | PC |
| Interlayer | Thickness [μm] | 0.8 | 0.8 | 0.8 | 0.8 | 0.8 | 0.8 |
| | Material | AITRON Z-913-3 (manufactured by Aica Kogyo Co., Ltd.) | ARONIX M240 (manufactured by TOAGOSEI CO., LTD.) | AITRON Z-913-3 (manufactured by Aica Kogyo Co., Ltd.) | AITRON Z-913-3 (manufactured by Aica Kogyo Co., Ltd.) | AITRON Z-913-3 (manufactured by Aica Kogyo Co., Ltd.) | AITRON Z-913-3 (manufactured by Aica Kogyo Co., Ltd.) |
| Makeup of plating target layer-forming composition | Aqueous solution of polybutadiene maleic acid (42 wt % aq.) | 6 parts by mass | 6 parts by mass | 6 parts by mass | 6 parts by mass | 6 parts by mass | 6 parts by mass |
| | Difunctional acrylamide (AA) | 2.5 parts by mass | 2.5 parts by mass | 2.5 parts by mass | 2.5 parts by mass | 2.5 parts by mass | 2.5 parts by mass |
| | Omnirad 127 | 0.13 parts by mass | 0.13 parts by mass | 0.13 parts by mass | 0.13 parts by mass | 0.13 parts by mass | 0.13 parts by mass |
| | IPA | 91.5 parts by mass | 91.5 parts by mass | 91.5 parts by mass | 91.5 parts by mass | 91.5 parts by mass | 91.5 parts by mass |
| | Protective layer | IMB-006 Manufactured by Teikoku Printing Inks Mfg. Co., Ltd | IMB-006 Manufactured by Teikoku Printing Inks Mfg. Co., Ltd | IMB-006 Manufactured by Teikoku Printing Inks Mfg. Co., Ltd. | SEPTON 2104 Manufactured by Kuraray Co., Ltd. | Glass-reinforced fiber-containing thermoplastic resin | DICSTYRENE GPPS-CR3500 Manufactured by DIC CORPORATION |
| Modulus of elasticity of protective layer at 25° C. [Gpa] | | 2.00 | 2.00 | 2.00 | 0.10 | 5.00 | 3.00 |
| Modulus of elasticity of substrate at 25° C. (a) [GPa] | | 2.00 | 2.00 | 2.00 | 2.00 | 2.00 | 2.00 |
| Modulus of elasticity of interlayer at 25° C. (b) [GPa] | | 0.20 | 0.05 | 0.20 | 0.20 | 0.20 | 0.20 |
| Ratio of modulus of elasticity of interlayer to substrate (b/a) | | 0.100 | 0.025 | 0.100 | 0.100 | 0.100 | 0.100 |
| Area ratio of metal layer | | 60% | 60% | 40% | 60% | 60% | 60% |
| Evaluation | Whether or not wire breakage occurs after high-temperature and high-pressure process | A | A | A | B | B | A |
| | Impact resistance | A | A | A | B | B | A |

|  |  | Example 7 | Example 8 | Example 9 | Example 10 | Example 11 |
|---|---|---|---|---|---|---|
| | Substrate | PC | PP | PC | PC | PC |
| Interlayer | Thickness [μm] | 0.8 | 0.8 | 0.8 | 0.2 | 5.0 |
| | Material | AITRON Z-913-3 (manufactured by Aica Kogyo Co., Ltd.) | AITRON Z-913-3 (manufactured by Aica Kogyo Co., Ltd.) + Difunctional acrylamide (AA) | AITRON Z-913-3 (manufactured by Aica Kogyo Co., Ltd.) | AITRON Z-913-3 (manufactured by Aica Kogyo Co., Ltd.) | AITRON Z-913-3 (manufactured by Aica Kogyo Co., Ltd.) |
| Makeup of plating target layer-forming composition | Aqueous solution of polybutadiene maleic acid (42 wt % aq.) | 6 parts by mass | 6 parts by mass | 6 parts by mass | 6 parts by mass | 6 parts by mass |
| | Difunctional acrylamide (AA) | 2.5 parts by mass | 2.5 parts by mass | 2.5 parts by mass | 2.5 parts by mass | 2.5 parts by mass |
| | Omnirad 127 | 0.13 parts by mass | 0.13 parts by mass | 0.13 parts by mass | 0.13 parts by mass | 0.13 parts by mass |
| | IPA | 91.5 parts by mass | 91.5 parts by mass | 91.5 parts by mass | 91.5 parts by mass | 91.5 parts by mass |
| | Protective layer | TE30S Manufactured by Denka Company Limited. | IMB-006 Manufactured by Teikoku Printing Inks Mfg. Co., Ltd | IMB-006 Manufactured by Teikoku Printing Inks Mfg. Co., Ltd | IMB-006 Manufactured by Teikoku Printing Inks Mfg. Co., Ltd | IMB-006 Manufactured by Teikoku Printing Inks Mfg. Co., Ltd |
| Modulus of elasticity of protective layer at 25° C. [Gpa] | | 1.00 | 2.00 | 2.00 | 2.00 | 2.00 |
| Modulus of elasticity of substrate at 25° C. (a) [GPa] | | 2.00 | 1.00 | 2.00 | 2.00 | 2.00 |
| Modulus of elasticity of interlayer at 25° C. (b) [GPa] | | 0.20 | 0.50 | 0.20 | 0.20 | 0.20 |
| Ratio of modulus of elasticity of interlayer to substrate (b/a) | | 0.100 | 0.500 | 0.100 | 0.100 | 0.100 |

TABLE 1-continued

| | | | | | | |
|---|---|---|---|---|---|---|
| Area ratio of metal layer | | 60% | 60% | 0.2% | 60% | 60% |
| Evaluation | Whether or not wire breakage occurs after high-temperature and high-pressure process | A | B | A | A | A |
| | Impact resistance | A | B | A | A | A |

TABLE 2

| Continued from Table 1 | | Comparative Example 1 | Comparative Example 2 | Comparative Example 3 | Comparative Example 4 |
|---|---|---|---|---|---|
| Interlayer | Substrate | PC | PC | PC | PC |
| | Thickness [µm] | 0.8 | 0.8 | 0.8 | 0.8 |
| | Material | A-DPH (manufactured by Shin-Nakamura Chemical Co, Ltd.) | HNBR (trade name Zetpol: manufactured by Zeon Corporation) | AITRON Z-913-3 (manufactured by Aica Kogyo Co., Ltd.) | AITRON Z-913-3 (manufactured by Aica Kogyo Co., Ltd.) |
| Makeup of plating target layer-forming composition | Aqueous solution of polybutadiene maleic acid (42 wt % aq.) | 6 parts by mass | 6 parts by mass | 6 parts by mass | 6 parts by mass |
| | Difunctional acrylamide (AA) | 2.5 parts by mass | 2.5 parts by mass | 2.5 parts by mass | 2.5 parts by mass |
| | Omnirad 127 | 0.13 parts by mass | 0.13 parts by mass | 0.13 parts by mass | 0.13 parts by mass |
| | IPA | 91.5 parts by mass | 91.5 parts by mass | 91.5 parts by mass | 91.5 parts by mass |
| Protective layer | | IMB-006 Manufactured by Teikoku Printing Inks Mfg. Co., Ltd | IMB-006 Manufactured by Teikoku Printing Inks Mfg. Co., Ltd | IMB-006 Manufactured by Teikoku Printing Inks Mfg. Co.,Ltd | SilFort PHC587 (Momentive Performance Materials Inc.) |
| Modulus of elasticity of protective layer at 25° C. [GPa] | | 2.00 | 2.00 | 2.00 | 20.0 |
| Modulus of elasticity of substrate at 25° C. (a) [GPa] | | 2.00 | 2.00 | 2.00 | 2.00 |
| Modulus of elasticity of interlayer at 25° C. (b) [GPa] | | 2.00 | 0.008 | 0.20 | 0.20 |
| Ratio of modulus of elasticity of interlayer to substrate (b/a) | | 1.000 | 0.004 | 0.100 | 0.100 |
| Area ratio of metal layer | | 60% | 60% | 90% | 60% |
| Evaluation | Whether or not wire breakage occurs after high-temperature and high-pressure process | C | A | C | C |
| | Impact resistance | A | C | A | C |

From the results in Table 1, it has been revealed that the conductive members of the examples inhibit the breakage of thin metal wires in a high-temperature and high-pressure process and have excellent impact resistance.

In contrast, the conductive members of the comparative examples did not bring about desired effects.

Particularly, it has been confirmed that in Comparative Example 2, because the modulus of elasticity of the interlayer is far lower than the modulus of elasticity of the substrate, in a case where impact is applied to the conductive member from the substrate side, the thin metal wires constituting the mesh-shaped metal layer are broken.

EXPLANATION OF REFERENCES

2: substrate
4: interlayer
6: patterned plating target layer
8, 20: metal layer
10: protective layer
12: conductive member
14: thin wire
$T_A$, $T_B$: opening portion
$L_A$: length of one side of opening portion $T_A$
$L_B$: length of one side of opening portion $T_B$
16: thin metal wire
22: electrode pattern
24: electrode terminal

What is claimed is:
1. A conductive member, comprising:
a substrate;
an interlayer disposed on at least one surface of the substrate;
a patterned plating target layer that is disposed in the form of a mesh on the interlayer and has a functional group interacting with a plating catalyst or a precursor thereof;
a mesh-shaped metal layer that is disposed on the patterned plating target layer and includes a plurality of crossing thin metal wires; and
a protective layer disposed on the metal layer,
wherein in a case where a represents a modulus of elasticity of the substrate at 25° C. and b represents a modulus of elasticity of the interlayer at 25° C., the conductive member satisfies a following Formula A,

$$0.010 \leq b/a \leq 0.500, \quad \text{Formula A:}$$

an area ratio of the metal layer is 0.2% to 60%, and
a modulus of elasticity of the protective layer at 25° C. is 0.10 to 5.00 GPa.

2. The conductive member according to claim 1,
wherein the patterned plating target layer is a layer formed by forming a precursor layer of a plating target layer on the interlayer and performing an exposure treatment in a form of mesh on the precursor layer of a plating target layer, and
the precursor layer contains following compound X or composition Y,
compound X: a compound having a functional group interacting with a plating catalyst or a precursor thereof and a polymerizable group,
composition Y: a composition containing a compound having a functional group that interacts with a plating catalyst or a precursor thereof and a compound having a polymerizable group.

3. The conductive member according to claim 1,
wherein the metal layer is a layer formed by applying a plating catalyst or a precursor thereof to the patterned plating target layer and performing a plating treatment on the patterned plating target layer to which the plating catalyst or a precursor thereof is applied.

4. The conductive member according to claim 1,
wherein the modulus of elasticity of the protective layer at 25° C. is 1.00 to 3.00 GPa.

5. The conductive member according to claim 1, which satisfies the following formula B, $$0.010 \leq b/a \leq 0.200. \qquad \text{Formula B:}$$

6. A touch panel sensor comprising:
the conductive member according to claim 1.

7. A touch panel comprising:
the conductive member according to claim 1.

8. A method for manufacturing a molded article using the conductive member according to claim 1, comprising:
steps of disposing the conductive member on one a first mold and a second mold so that the substrate and one of the molds face each other, clamping the first mold and the second mold together, and injecting a resin into a mold cavity formed by the first mold and the second mold so as to obtain a molded article including the conductive member and a resin layer.

9. The conductive member according to claim 1,
wherein a thickness of the interlayer is 0.2 to 5.0 μm.

10. The conductive member according to claim 9,
wherein the patterned plating target layer is a layer formed by forming a precursor layer of a plating target layer on the interlayer and performing an exposure treatment in the form of a mesh on the precursor layer of a plating target layer, and
the precursor layer contains the following compound X or composition Y,
compound X: a compound having a functional group interacting with a plating catalyst or a precursor thereof and a polymerizable group,
composition Y: a composition containing a compound having a functional group that interacts with a plating catalyst or a precursor thereof and a compound having a polymerizable group.

11. The conductive member according to claim 9,
wherein the metal layer is a layer formed by applying a plating catalyst or a precursor thereof to the patterned plating target layer and performing a plating treatment on the patterned plating target layer to which the plating catalyst or a precursor thereof is applied.

12. The conductive member according to claim 1,
wherein the metal layer contains one or more metals selected from the group consisting of copper, nickel, and gold.

13. The conductive member according to claim 12,
wherein a thickness of the interlayer is 0.2 to 5.0 μm.

14. The conductive member according to claim 12,
wherein the patterned plating target layer is a layer formed by forming a precursor layer of a plating target layer on the interlayer and performing an exposure treatment in a form of mesh on the precursor layer of a plating target layer, and
the precursor layer contains following compound X or composition Y,
compound X: a compound having a functional group interacting with a plating catalyst or a precursor thereof and a polymerizable group,
composition Y: a composition containing a compound having a functional group that interacts with a plating catalyst or a precursor thereof and a compound having a polymerizable group.

15. The conductive member according to claim 12,
wherein the metal layer is a layer formed by applying a plating catalyst or a precursor thereof to the patterned plating target layer and performing a plating treatment on the patterned plating target layer to which the plating catalyst or a precursor thereof is applied.

16. The conductive member according to claim 12,
wherein the modulus of elasticity of the protective layer at 25° C. is 1.00 to 3.00 GPa.

17. The conductive member according to claim 12, which satisfies the following formula B, $$0.010 \leq b/a \leq 0.200. \qquad \text{Formula B:}$$

18. A touch panel sensor comprising:
the conductive member according to claim 12.

19. A touch panel comprising:
the conductive member according to claim 12.

20. A method for manufacturing a molded article using the conductive member according to claim 12, comprising:
steps of disposing the conductive member on one a first mold and a second mold so that the substrate and one of the molds face each other, clamping the first mold and the second mold together, and injecting a resin into a mold cavity formed by the first mold and the second mold so as to obtain a molded article including the conductive member and a resin layer.

* * * * *